(12) United States Patent
Shu

(10) Patent No.: US 10,248,436 B2
(45) Date of Patent: Apr. 2, 2019

(54) ELECTRONIC APPARATUS CONTROLLING CONNECTION WITH ACCESSORY DEVICE, ACCESSORY DEVICE, CONTROL METHODS THEREFOR, AND STORAGE MEDIUMS STORING CONTROL PROGRAMS THEREFOR

(71) Applicant: CANON KABUSHIKI KAISHA, Tokyo (JP)

(72) Inventor: Takayuki Shu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 15/240,088

(22) Filed: Aug. 18, 2016

(65) Prior Publication Data

US 2017/0052797 A1 Feb. 23, 2017

(30) Foreign Application Priority Data

Aug. 21, 2015 (JP) .................................. 2015-163749

(51) Int. Cl.
G06F 9/445 (2018.01)
G06F 13/10 (2006.01)
H04N 5/232 (2006.01)

(52) U.S. Cl.
CPC ........ *G06F 9/44505* (2013.01); *G06F 13/102* (2013.01); *H04N 5/23209* (2013.01)

(58) Field of Classification Search
CPC .............. G06F 9/44505; G06F 13/102; H04N 5/23209
USPC ........................................................... 710/8
See application file for complete search history.

(56) References Cited

U.S. PATENT DOCUMENTS

| 3,696,338 A | * | 10/1972 | Preiss | ........................ G06F 1/08 710/60 |
| 4,951,068 A | * | 8/1990 | Ichikawa | ................. G03B 7/16 396/178 |
| 5,008,902 A | * | 4/1991 | Key | ..................... H04L 25/0262 370/465 |
| 5,652,848 A | * | 7/1997 | Bui | ......................... G06F 13/28 710/307 |
| 5,745,708 A | * | 4/1998 | Weppler | ................. G06F 13/374 710/119 |

(Continued)

FOREIGN PATENT DOCUMENTS

JP 02-063030 A 3/1990

*Primary Examiner* — Paul R. Myers
(74) *Attorney, Agent, or Firm* — Cowan, Liebowitz & Latman, P.C.

(57) ABSTRACT

An electronic apparatus that is capable of checking connection between the electronic apparatus body and accessories without performing communication between the electronic apparatus body and accessories. The electronic apparatus is capable of communicating with an accessory device connected. A detection unit detects whether the accessory device supports both a first communication method and a second communication method of which communication speed is higher than communication speed of the first communication method. A setting unit sets the second communication method during communication when the detection unit detects that the accessory device supports both the first communication method and the second communication method, and to set the first communication method except communicating.

15 Claims, 12 Drawing Sheets

(56) References Cited

U.S. PATENT DOCUMENTS

| | | | | |
|---|---|---|---|---|
| 5,802,331 A * | 9/1998 | Van Berkel | G06F 9/3871 | 712/1 |
| 5,944,802 A * | 8/1999 | Bello | G06F 13/122 | 710/52 |
| 6,477,171 B1 * | 11/2002 | Wakeley | H04L 12/42 | 370/404 |
| 6,532,506 B1 * | 3/2003 | Dunstan | G06F 13/4295 | 326/86 |
| 6,721,892 B1 * | 4/2004 | Osborn | G06F 1/3203 | 713/300 |
| 6,738,834 B1 * | 5/2004 | Williams | G06F 13/4072 | 710/10 |
| 6,907,008 B1 * | 6/2005 | Moskovich | H04L 29/06 | 370/241 |
| 7,181,557 B1 * | 2/2007 | Falik | G06F 13/4286 | 710/105 |
| 7,461,318 B2 * | 12/2008 | Fukae | G06F 13/426 | 710/300 |
| 7,607,579 B2 * | 10/2009 | Yoshida | G06F 3/0611 | 235/375 |
| 7,684,477 B1 * | 3/2010 | Vijayaraghavan | H04L 1/0002 | 375/225 |
| 8,116,147 B1 * | 2/2012 | Uddenberg | G06F 11/221 | 365/189.05 |
| 8,281,062 B2 * | 10/2012 | Hahn | G06F 3/0613 | 710/13 |
| 8,412,976 B2 * | 4/2013 | Kraipak | G06F 13/4291 | 713/600 |
| 9,614,776 B1 * | 4/2017 | Sutardja | H04L 47/25 | |
| 2004/0243666 A1 * | 12/2004 | Wood | G06F 13/4295 | 709/202 |
| 2005/0246474 A1 * | 11/2005 | Wolfe | G06F 13/4027 | 710/306 |
| 2007/0133562 A1 * | 6/2007 | Ghiasi | H04L 49/3054 | 370/395.42 |
| 2010/0123924 A1 * | 5/2010 | Kumada | H04L 25/05 | 358/1.15 |
| 2011/0164881 A1 * | 7/2011 | Rajagopal | H04B 10/1149 | 398/128 |
| 2011/0188621 A1 * | 8/2011 | Asaduzzaman | H03L 7/0814 | 375/374 |
| 2012/0327819 A1 * | 12/2012 | Liang | G06K 7/0008 | 370/277 |
| 2014/0078933 A1 * | 3/2014 | Yan | H04L 12/413 | 370/254 |

* cited by examiner

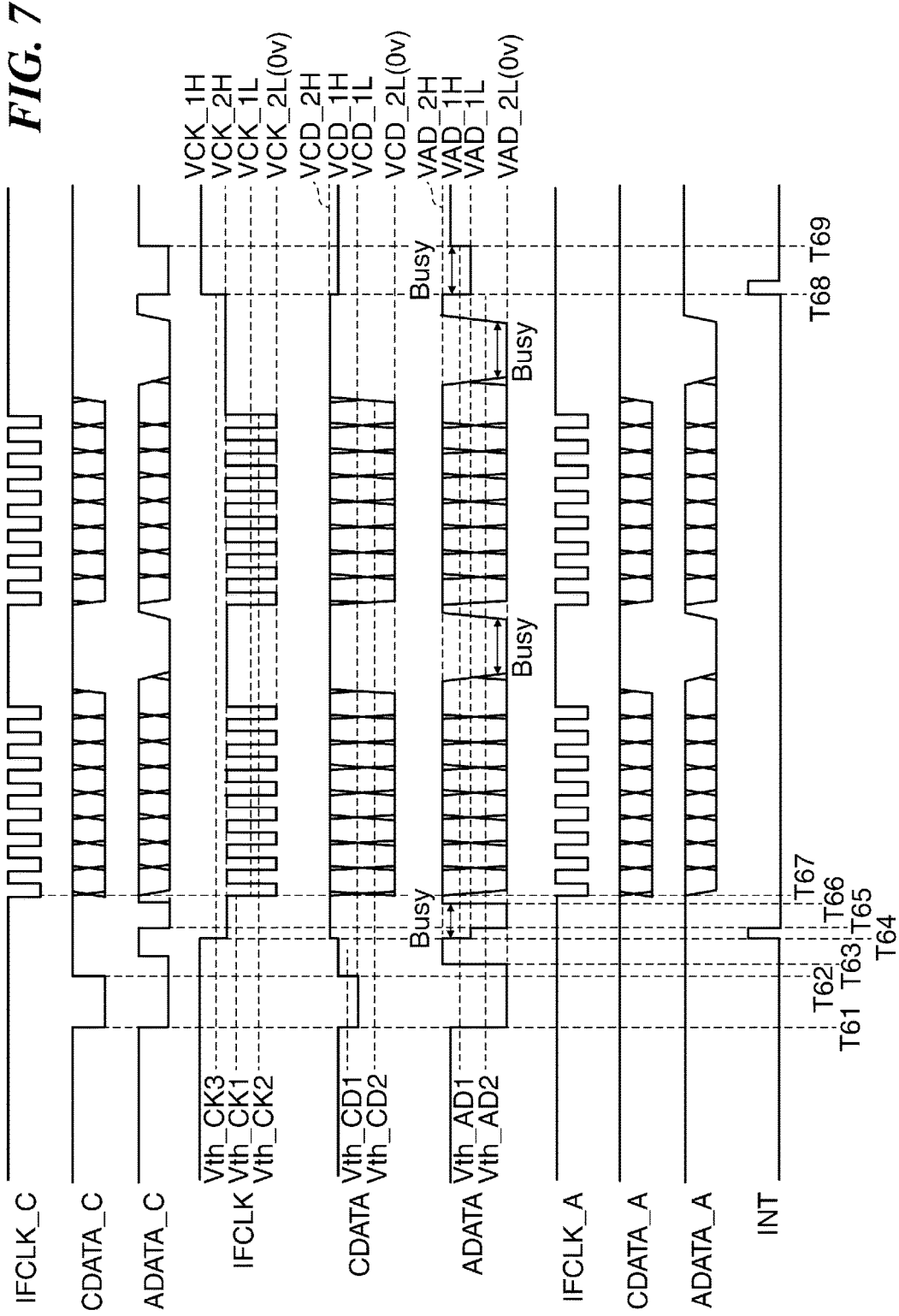

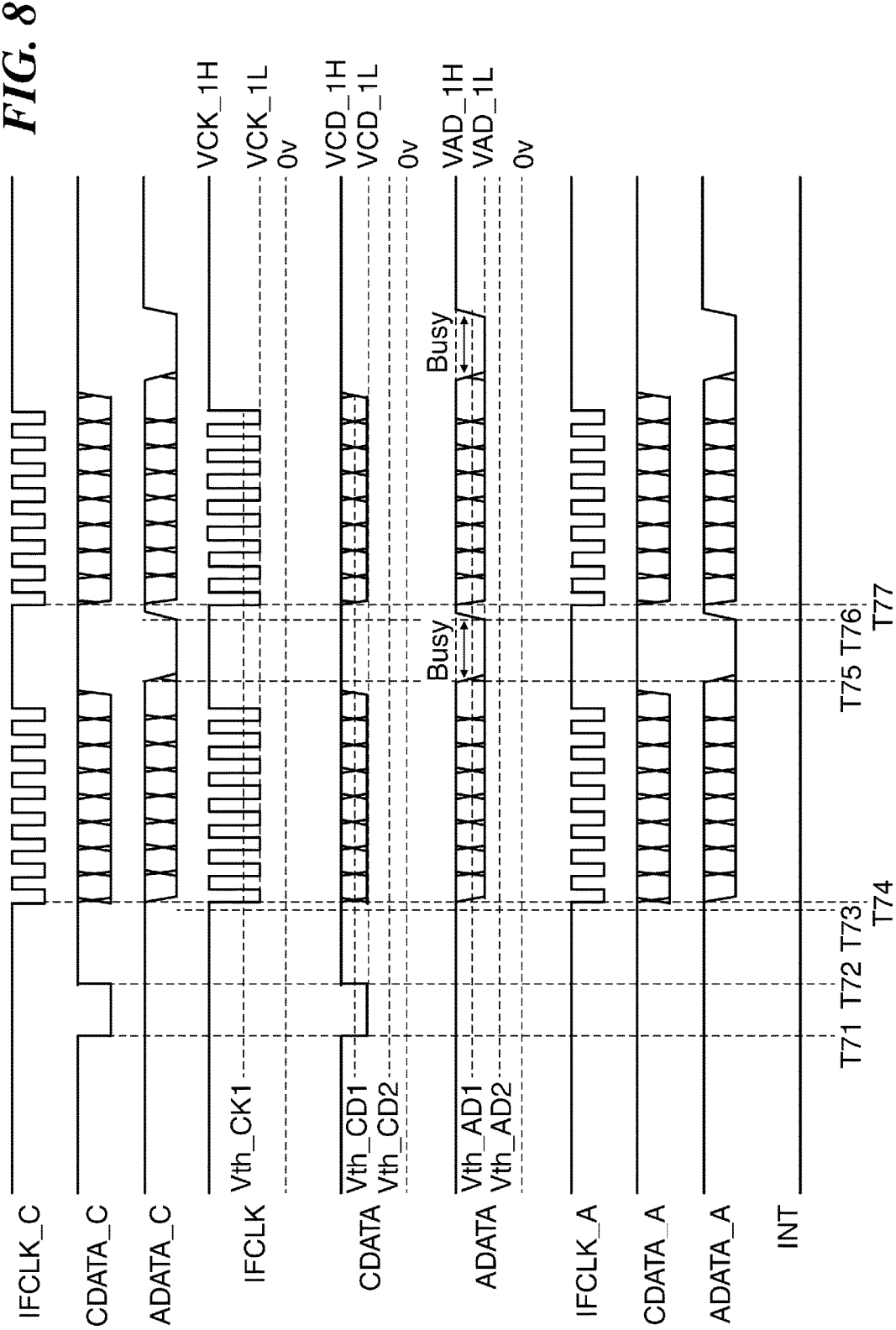

ELECTRONIC APPARATUS CONTROLLING CONNECTION WITH ACCESSORY DEVICE, ACCESSORY DEVICE, CONTROL METHODS THEREFOR, AND STORAGE MEDIUMS STORING CONTROL PROGRAMS THEREFOR

BACKGROUND OF THE INVENTION

Field of the Invention

The present invention relates to an electronic apparatus, an accessory device, control methods therefor, and storage mediums storing control programs therefor, and in particular, relates to a connection-detection control between an electronic apparatus body and accessories, and to a switching control of a communication protocol (a communication system).

Description of the Related Art

An image pickup apparatus, such as a digital camera, is one of electronic apparatuses. Conventionally, when a body of an image pickup apparatus, such as a camera body of a digital camera, is connected to accessories, such as a flash device and an interchangeable lens unit, connection of communication terminals of the camera body and the accessories is detected. Then, when detecting the connection, the camera body communicates with the accessories. The camera body determines that the connection is abnormal when there is no reply from the accessories or when reply data has anomalies.

Furthermore, when a communication protocol (i.e., a communication system) is changed, it is determined whether a post-change communication method (a new communication method) is acceptable by communicating in a pre-change communication method (an old communication method). If acceptable, the communication method is changed to the new communication method.

For example, Japanese Laid-Open Patent Publication (Kokai) No. H2-63030 (JP H2-63030A) discloses the following technique. An interchangeable lens unit is provided with first, second, and third information transmission units that have different amount of information. When the interchangeable lens unit is connected to a camera body, the interchangeable lens unit selects one information transmission unit corresponding to an ability of the camera body and communicates with the camera body. In this publication, when it becomes clear that the camera body has an ability corresponding to the second or third information transmission unit that has large amount of information during the communication using the first information transmission unit that has small amount of information, the interchangeable lens unit starts communicating with the camera body using one of the second and third information transmission unit.

However, the camera disclosed in the above-mentioned publication needs to determine reply contents transmitted to the camera body from the interchangeable lens after connection in order to check the connection between the interchangeable lens unit and the camera body. Accordingly, the camera body needs to verify accuracy of the determination and takes time for the determination process.

Furthermore, when a communication method is changed from an old communication method (first communication method) to a new communication method (second communication method), it is necessary to check whether the new communication method is acceptable by communicating in the old communication method before changing to the new communication method, which takes time for changing.

SUMMARY OF THE INVENTION

The present invention provides an electronic apparatus, an accessory device, control methods therefor, and storage mediums storing control programs therefor, which are capable of checking connection between the electronic apparatus body and accessories without performing communication between the electronic apparatus body and accessories.

Furthermore, the present invention provide an electronic apparatus, an accessory device, control methods therefor, and storage mediums storing control programs therefor, which are capable of changing a communication method from a first communication method to a second communication method without performing communication in the first communication method.

Accordingly, a first aspect of the present invention provides an electronic apparatus capable of communicating with an accessory device connected, the electronic apparatus comprising a detection unit configured to detect whether the accessory device supports both a first communication method and a second communication method of which communication speed is higher than communication speed of the first communication method, and a setting unit configured to set the second communication method during communication when the detection unit detects that the accessory device supports both the first communication method and the second communication method, and to set the first communication method except communicating.

Accordingly, a second aspect of the present invention provides an accessory device capable of communicating with an electronic apparatus connected, the accessory device comprising a setting unit configured to set one of a first communication method and a second communication method of which communication speed is higher than communication speed of the first communication method, a reception unit configured to receive a clock signal transmitted from the electronic apparatus, and a notification unit configured to notify the electronic apparatus that the first communication method is set by changing accessory data to a high level from a low level in the first communication method, when change of the clock signal to the high level in the first communication method is detected.

Accordingly, a third aspect of the present invention provides a control method for an electronic apparatus capable of communicating with an accessory device connected, the control method comprising a detection step of detecting whether the accessory device supports both a first communication method and a second communication method of which communication speed is higher than communication speed of the first communication method, and a setting step of setting the second communication method during communication when it is detected that the accessory device supports both the first communication method and the second communication method in the detection step, and to set the first communication method except communicating.

Accordingly, a fourth aspect of the present invention provides A control method for an accessory device capable of communicating with an electronic apparatus connected, the control method comprising a setting step of setting one of a first communication method and a second communication method of which communication speed is higher than communication speed of the first communication method, a receiving step of receiving a clock signal transmitted from the electronic apparatus, and a notification step of notifying the electronic apparatus that the first communication method is set by changing accessory data to a high level from a low level in the first communication method, when change of the clock signal to the high level in the first communication method is detected.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

The present invention enables to check the connection and to change the communication method to the second communication method without affecting to an accessory device that supports a first communication method only. Furthermore, the present invention enables to change the communication method to the second communication method in short time without performing communication in the first communication method.

Further features of the present invention will become apparent from the following description of exemplary embodiments with reference to the attached drawings.

BRIEF DESCRIPTION OF THE DRAWINGS

FIG. 2A is a circuit diagram showing an interface circuit concerning a clock signal sent to the accessory from the camera body. FIG. 2B is a circuit diagram showing an interface circuit concerning communication data sent to the accessory from the camera body. FIG. 2C is a circuit diagram showing an interface circuit concerning data sent to the camera body from the accessory.

FIG. 3A is a circuit diagram showing an interface circuit concerning a clock signal sent to the accessory from the camera body. FIG. 3B is a circuit diagram showing an interface circuit concerning communication data sent to the accessory from the camera body. FIG. 3C is a circuit diagram showing an interface circuit concerning data sent to the camera body from the accessory.

FIG. 4A is a circuit diagram showing an interface circuit concerning a clock signal sent to the accessory from the camera body. FIG. 4B is a circuit diagram showing an interface circuit concerning communication data sent to the accessory from the camera body. FIG. 4C is a circuit diagram showing an interface circuit concerning data sent to the camera body from the accessory.

FIG. 7 is a timing chart for describing statuses of the communication terminals (connection terminals) when connections are checked and when the communication method is changed to the second communication method in the camera shown in FIG. 1.

FIG. 8 is a timing chart for describing statuses of the communication terminals when the accessory shown in FIG. 1 supports the first communication method only.

DESCRIPTION OF THE EMBODIMENTS

Figure 1:
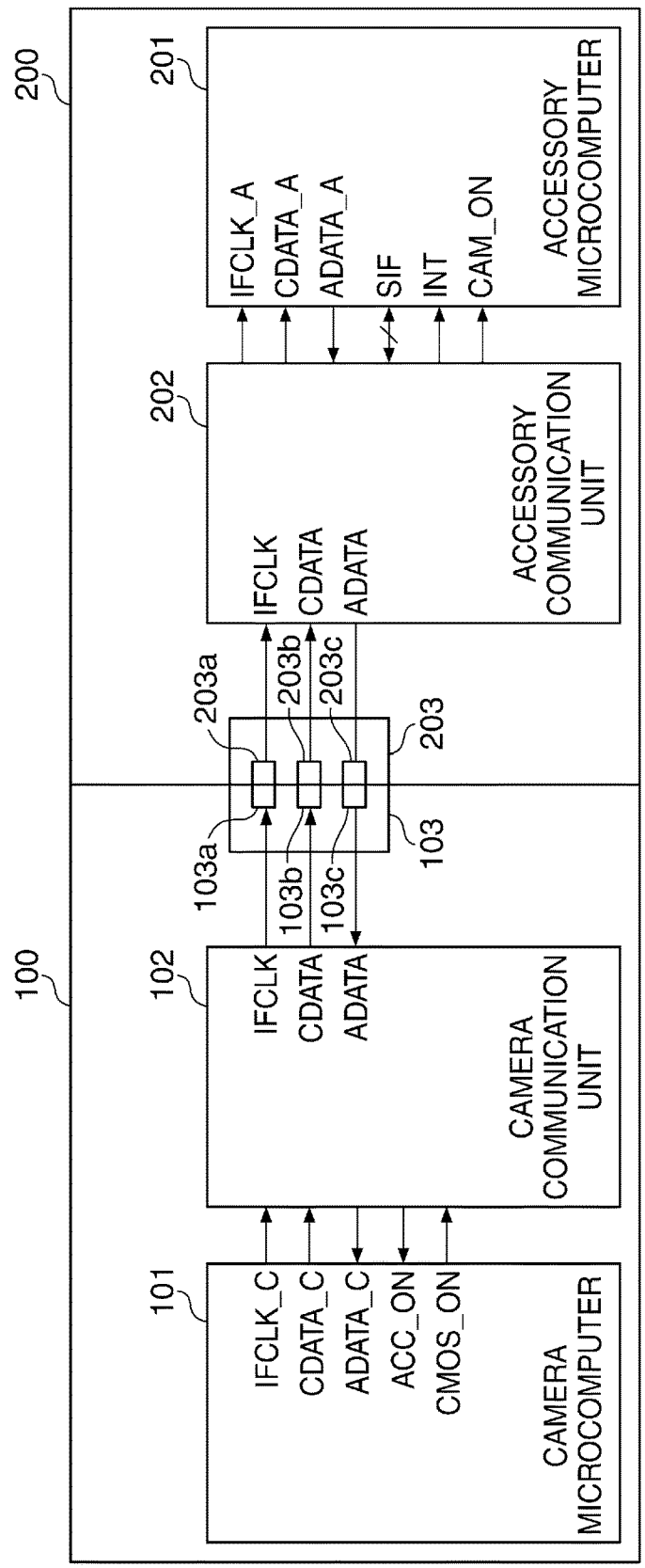
FIG. 1 is a block diagram schematically showing an example of a camera according to an embodiment of the present invention with an accessory.

Hereafter, one example of an electronic apparatus of an embodiment according to the present invention will be described in detail with reference to the drawings. In this embodiment, a digital camera (hereinafter referred to as a camera, simply) will be described as an example of an electronic apparatus, and accessories, such as a light emission device, shall be connected to a camera body FIG. 1 is a block diagram schematically showing an example of a camera according to the embodiment of the present invention with an accessory.

The camera shown in FIG. 1 consists of a camera body 100 and an accessory device (hereinafter referred to as an accessory, simply) 200, such as a light emission device (a flash device), which is connected to the camera body 100. It should be noted that the camera body 100 picks up an image of an object and obtains image data.

The camera body 100 is provided with a camera microcomputer 101 that controls the camera body 100 and communicates with the accessory 200 (data communication).

A camera communication unit 102 is an interface circuit (I/F) for connecting the camera microcomputer 101 with an accessory microcomputer 201 of the accessory 200. Then, the camera communication unit 102 supports both a first communication method and second communication method mentioned later. The communication speed of the second communication method is higher than that of the first communication method. The camera body 100 is connected to the accessory 200 through a communication contact unit 103.

The communication contact unit 103 has a clock (IFCLK) terminal 103a, communications data (CDATA) terminal 103b, and data (ADATA) terminal 103c. The IFCLK terminal 103a is used to output a clock signal to the accessory 200 from the camera body 100. Moreover, the CDATA terminal 103b is used to transmit communications data (electric device data) to the accessory 200 from the camera body 100 in synchronization with the clock signal. Then, the ADATA terminal 103c is used to receive the data (accessory data) by the camera body 100 from the accessory 200 in synchronization with the clock signal.

The accessory microcomputer 201 of the accessory 200 controls the accessory 200 and communicates with the camera microcomputer 101. An accessory communication unit 202 is an interface circuit (I/F) for connecting the camera microcomputer 101 with the accessory microcomputer 201, and supports the first and second communication methods. The accessory 200 is connected to the camera body 100 through the communication contact unit 203.

The communication contact unit 203 has a IFCLK terminal 203a, CDATA terminal 203b, and ADATA terminal 203c. The IFCLK terminal 203a, CDATA terminal 203b, and ADATA terminal 203c are respectively connected to the IFCLK terminal 103a, CDATA terminal 103b, and ADATA terminal 103c.

Figure 2A:
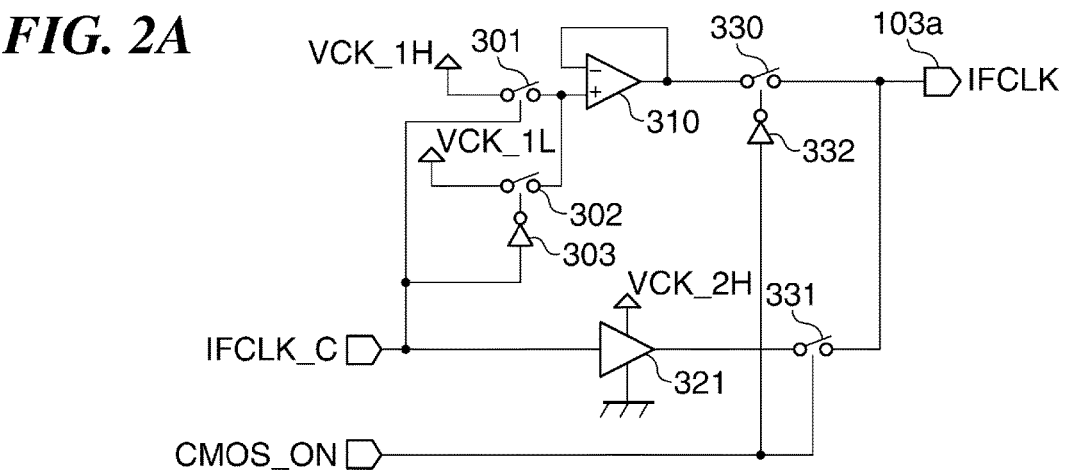
FIG. 2A, FIG. 2B, and FIG. 2C are circuit diagrams for describing a camera communication unit of a camera body shown in FIG. 1.
Figure 2B:
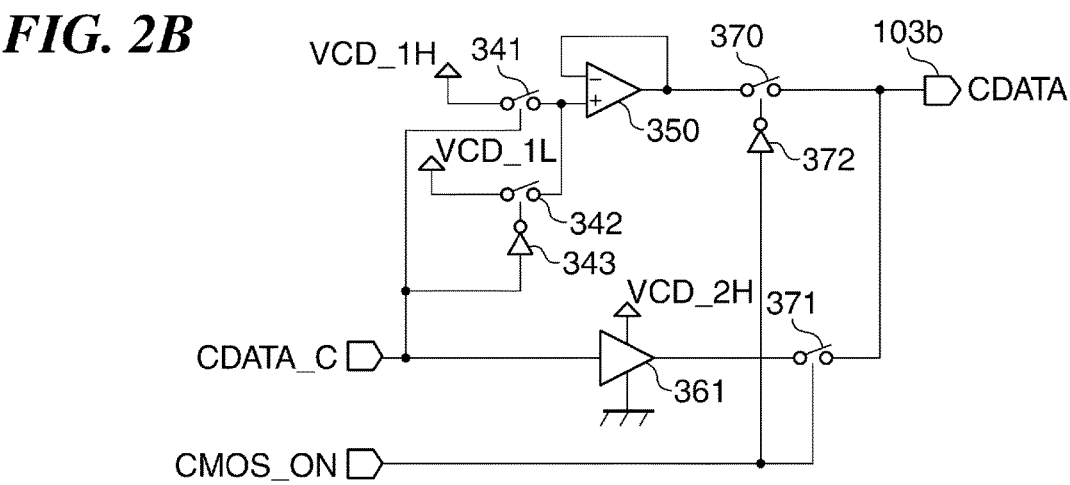
Figure 2C:
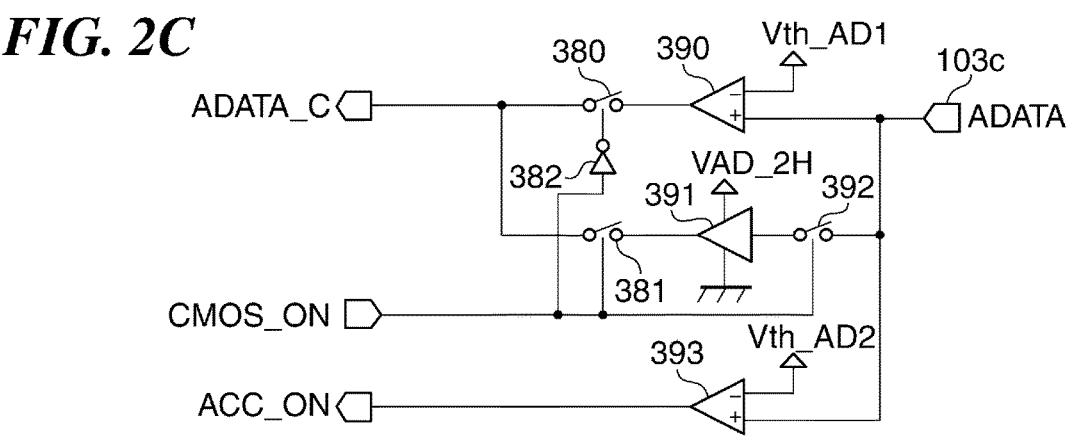

FIG. 2A, FIG. 2B, and FIG. 2C are circuit diagrams for describing the camera communication unit 102 of the camera body 100 shown in FIG. 1. FIG. 2A is a circuit diagram showing an interface circuit concerning a clock signal transmitted to the accessory 200 from the camera body 100. FIG. 2B is a circuit diagram showing an interface circuit concerning communication data transmitted to the accessory 200 from the camera body 100. Moreover, FIG. 2C is a circuit diagram showing an interface circuit concerning data transmitted to the camera body 100 from the accessory 200.

As shown in FIG. 2A, a communication clock (IFCLK_C) terminal of the camera microcomputer 101 is directly connected to a control terminal of an analog switch 301, and is connected to a control terminal of an analog switch 302 through an inverter 303. H (High) level voltage (VCK_1H) of the IFCLK terminal 103a is applied to one terminal of the analog switch 301, and the other terminal is connected to a non-inverted input terminal of an operational amplifier 310. It should be noted that VCK_1H of the IFCLK terminal 103a is H level voltage corresponding to the first communication method.

L (Low) level voltage (VCK_1L) of the IFCLK terminal 103a is applied to one terminal of the analog switch 302, and the other terminal is connected to the non-inverted input terminal of the operational amplifier 310. It should be noted that VCK_1L of the IFCLK terminal 103a is L level voltage corresponding to the first communication method.

An output terminal of the operational amplifier 310 is connected to an inverted input terminal. When the IFCLK_C terminal of the camera microcomputer 101 is the H level, the analog switch 301 becomes in the ON state, the analog switch 302 becomes in the OFF state, and the operational amplifier 310 outputs the VCK_1H of the IFCLK terminal 103a corresponding to the first communication method. On the other hand, when the IFCLK_C terminal of the camera microcomputer 101 is the L level, the analog switch 301 becomes in the OFF state, the analog switch 302 becomes in the ON state, and the operational amplifier 310 outputs VCK_1L of the IFCLK terminal 103a corresponding to the first communication method. The output terminal of the operational amplifier 310 is connected to one terminal of an analog switch 330.

The IFCLK_C terminal of the camera microcomputer 101 is connected also to an input terminal of a CMOS output buffer 321, and the CMOS output buffer 321 selectively outputs H level voltage (VCK_2H) or L level voltage (VCK_2L=0V) corresponding to the second communication method. Then, an output terminal of the CMOS output buffer 321 is connected to one terminal of an analog switch 331.

The other terminals of the analog switches 330 and 331 are connected to the IFCLK terminal 103a that is a communication contact point between the camera body 100 and the accessory 200. A communication method switching signal (CMOS_ON) terminal of the camera microcomputer 101 is connected to a control terminal of the analog switch 330 through an inverter 332 and is directly connected to a control terminal of the analog switch 331.

When the camera microcomputer 101 sets the CMOS_ON terminal to the L level, the analog switch 330 becomes in the ON state, the analog switch 331 becomes in the OFF state, and the output terminal of the operational amplifier 310 is connected to the IFCLK terminal 103a. That is, the IFCLK terminal 103a outputs VCK_1H or VCK_1L corresponding to the first communication method.

On the other hand, when the camera microcomputer 101 sets the CMOS_ON terminal to the H level, the analog switch 330 turns OFF, the analog switch 331 turns ON, and the output terminal of the CMOS output buffer 321 is connected to the IFCLK terminal 103a. That is, the IFCLK terminal 103a outputs VCK_2H or VCK_2L corresponding to the second communication method.

As shown in FIG. 2B, a data output (CDATA_C) terminal of the camera microcomputer 101 is directly connected to a control terminal of an analog switch 341, and is connected to a control terminal of an analog switch 342 through an inverter 343. H level voltage (VCD_1H) of the CDATA terminal 103b is applied to one terminal of the analog switch 341, and the other terminal is connected to a non-inverted input terminal of an operational amplifier 350. It should be noted that VCD_1H of the CDATA terminal 103b is the H level voltage corresponding to the first communication method.

L level voltage (VCD_1L) of the CDATA terminal 103b is applied to one terminal of the analog switch 342, and the other terminal is connected to the non-inverted input terminal of the operational amplifier 350. It should be noted that VCD_1L of the CDATA terminal 103b is the L level voltage corresponding to the first communication method.

An output terminal of the operational amplifier 350 is connected to an inverted input terminal thereof. When the data output terminal CDATA_C of the camera microcomputer 101 is the H level, the analog switch 341 becomes in the ON state, the analog switch 342 becomes in the OFF state, and the operational amplifier 350 outputs VCD_1H of the CDATA terminal 103b corresponding to the first communication method. On the other hand, when the data output terminal CDATA_C of the camera microcomputer 101 is the L level, the analog switch 341 becomes in the OFF state, the analog switch 342 becomes in the ON state, and the operational amplifier 350 outputs VCD_1L of the CDATA terminal 103b corresponding to the first communication method. The output terminal of the operational amplifier 350 is connected to one terminal of an analog switch 370.

A data output terminal CDATA_C of the camera microcomputer 101 is connected also to an input terminal of a CMOS output buffer 361, and the CMOS output buffer 361 selectively outputs H level voltage (VCD_2H) or L level voltage (VCD_2L=0V) corresponding to the second communication method. An output terminal of the CMOS output buffer 361 is connected to one terminal of an analog switch 371.

The other terminals of the analog switches 370 and 371 are connected to the CDATA terminal 103b that is the communication contact point between the camera body 100 and the accessory 200. The CMOS_ON terminal of the camera microcomputer 101 is connected to a control terminal of the analog switch 370 through an inverter 372 and is directly connected to a control terminal of the analog switch 371.

When the camera microcomputer 101 sets the CMOS_ON terminal to the L level, the analog switch 370 becomes in the ON state, the analog switch 371 becomes in the OFF state, and the output terminal of the operational amplifier 350 is connected to the CDATA terminal 103b. That is, the CDATA terminal 103b outputs VCD_1H or VCD_1L corresponding to the first communication method.

On the other hand, when the camera microcomputer 101 sets the CMOS_ON terminal to the H level, the analog switch 370 turns OFF, the analog switch 371 turns ON, and the output terminal of the CMOS output buffer 361 is connected to the CDATA terminal 103b. That is, the CDATA terminal 103b outputs VCD_2H or VCD_2L corresponding to the second communication methods.

Next, as shown in FIG. 2C, the ADATA terminal 103c that is the communication contact point between the camera body 100 and the accessory 200 is connected to a non-inverted input terminal of a comparator 390 and is also connected to an input terminal of a buffer 391 through an analog switch 392. Furthermore, the ADATA terminal 103c is connected to a non-inverted input terminal of a comparator 393.

Determination threshold (threshold voltage) Vth_AD1 that distinguishes the H level and L level of the ADATA terminal 103c corresponding to the first communication method is applied to an inverted input terminal of the comparator 390, and the comparator 390 output a comparison result. It should be noted that a relation of VAD_1 L<Vth_AD1<VAD_1H is held. Then, an output terminal of the comparator 390 is connected to a serial-data input (ADATA_C) terminal of the camera microcomputer 101 through an analog switch 380.

The buffer 391 is a CMOS buffer that converts power supply voltage into H level voltage (VAD_2H) of the ADATA terminal 103c corresponding to the second communication method. The output of the buffer 391 is connected to the ADATA_C terminal of the camera microcomputer 101 through an analog switch 381.

The CMOS_ON terminal of the camera microcomputer 101 is connected to a control terminal of the analog switch 380 through an inverter 382 and is directly connected to control terminals of the analog switches 381 and 392.

Connection check voltage Vth_AD2 of the ADATA terminal 103c is applied to the non-inverted input terminal of the comparator 393. It should be noted that a relation of 0V<Vth_AD2<VAD_1 is held. Moreover, the connection check voltage Vth_AD2 may be employed as the determination threshold that distinguishes the H level and L level of in the second communication method. Then, the output terminal of the comparator 393 is connected with a connection check (ACC_ON) terminal of the camera microcomputer 101.

When the camera microcomputer 101 sets the CMOS_ON terminal to the L level, the analog switch 380 becomes in the ON state, the analog switches 381 and 392 become in the OFF state, and the output terminal of the comparator 390 is connected to the ADATA_C terminal. That is, the input and output in the first communication method can be used as the input and output through the communication contact unit 103. When the camera microcomputer 101 sets the CMOS_ON terminal to the H level, the analog switch 380 becomes in the OFF state, the analog switches 381 and 392 become in the ON state, and the output terminal of the buffer 391 is connected to the ADATA_C terminal. That is, the input and output in the second communication method can be used as the input and output through the communication contact unit 103.

Figure 3A:
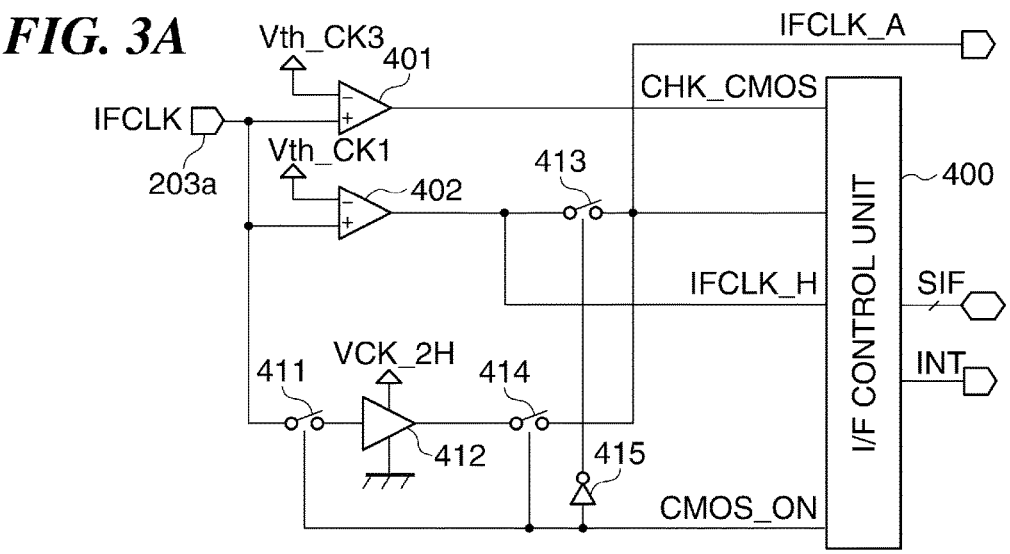
FIG. 3A, FIG. 3B, and FIG. 3C are circuit diagrams for describing an accessory communication unit of the accessory shown in FIG. 1.
Figure 3B:
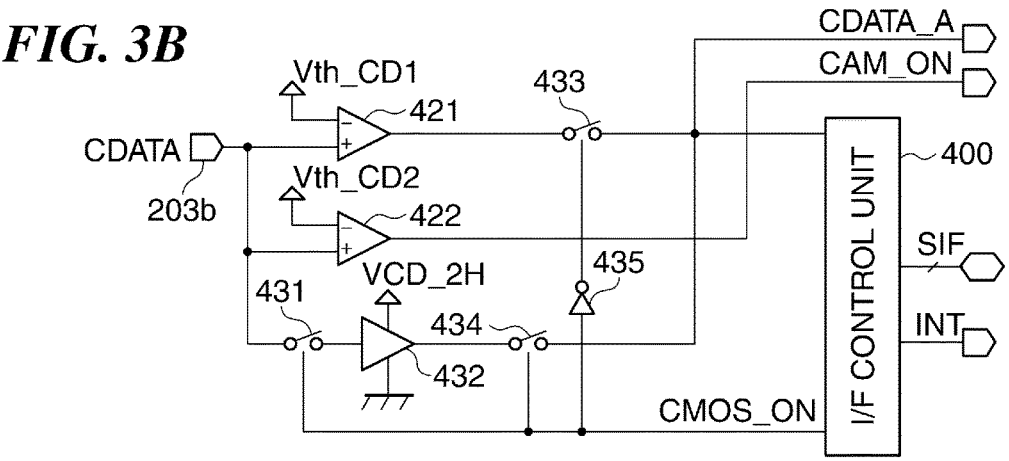
Figure 3C:
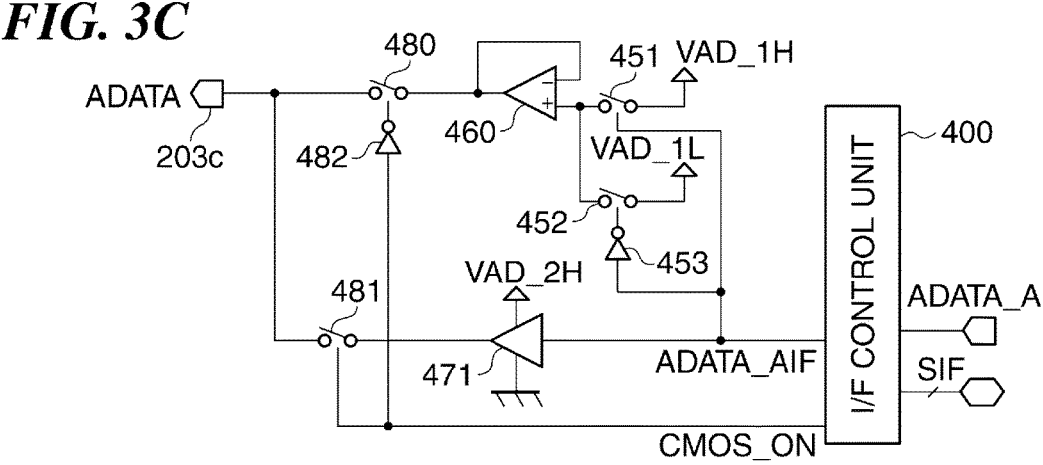

FIG. 3A, FIG. 3B, and FIG. 3C are circuit diagrams for describing the accessory communication unit 202 of the accessory 200 shown in FIG. 1. FIG. 3A is a circuit diagram showing an interface circuit concerning a clock signal transmitted to the accessory 200 from the camera body 100. FIG. 3B is a circuit diagram showing an interface circuit concerning communication data transmitted to the accessory 200 from the camera body 100. Moreover, FIG. 3C is a circuit diagram showing an interface circuit concerning data transmitted to the camera body 100 from the accessory 200.

First, as shown in FIG. 3A, an I/F control unit 400 communicates with the accessory microcomputer 201 through a serial communication interface SIF. Then, the I/F control unit 400 controls various signals according to commands from the accessory microcomputer 201 as mention later. Moreover, the I/F control unit 400 outputs an interrupt signal INT to the accessory microcomputer 201 in response to an input signal from the camera body 100 as mention later.

The IFCLK terminal 203a that is the communication contact point between the camera body 100 and the accessory 200 is connected to non-inverted input terminals of comparators 401 and 402. Furthermore, the IFCLK terminal 203a is connected to an input terminal of a buffer 412 through an analog switch 411.

Determination threshold voltage Vth_CK3 is applied to the inverted input end of the comparator 401. The comparator 401 determines whether the input level of the IFCLK terminal 203a corresponds to the H level (VCK_1H) corresponding to the first communication method or the H level (VCK_2H) corresponding to the second communication method. It should be noted that a relation of VCK_2H<Vth_CK3<VCK_1H is held. Then, the output CHK_CMOS of the comparator 401 is input into the I/F control unit 400.

Threshold voltage Vth_CK1 that distinguishes the H level (VCK_1H) and L level (VCK_1L) of the IFCLK terminal 203a corresponding to the first communication method is applied to an inverted input terminal of the comparator 402. It should be noted that a relation of VCK_1L<Vth_CK1<VCK_1H is held. Then, the output IFCLK_H of the comparator 402 is directly connected to the I/F control unit 400, and is connected to the I/F control unit 400 and the clocked input (IFCLK_A) terminal of the accessory microcomputer 201 through an analog switch 413.

The buffer 412 is a CMOS buffer that converts the power supply voltage into H level of the IFCLK terminal 203a corresponding to the second communication method. The output IFCLK_A of the buffer 412 is connected to the I/F control unit 400 and the IFCLK_A terminal of the accessory microcomputer 201 through an analog switch 414.

The output CMOS_ON of the I/F control unit 400 is connected to a control terminal of the analog switch 413 through an inverter 415 and is directly connected to control terminals of the analog switches 411 and 414.

Next, as shown in FIG. 3B, the CDATA terminal 203b that is the communication contact point between the camera body 100 and the accessory 200 is connected to non-inverted input terminals of comparators 421 and 422. Furthermore, the CDATA terminal 203b is connected to an input terminal of a buffer 432 through an analog switch 431.

Threshold voltage Vth_CD1 that distinguishes the H level (VCD_1H) and L level (VCD_1L) of the CDATA terminal 203b corresponding to the first communication method is applied to an inverted input terminal of the comparator 421. It should be noted that a relation of VCD_1L<Vth_CD1<VCD_1H is held. Then, an output of the comparator 421 is connected to a data inputs (CDATA_A) terminal of the accessory microcomputer 201 through an analog switch 433.

Threshold voltage Vth_CD2 is applied to an inverted input terminal of the comparator 422. The threshold voltage Vth_CD2 is in a range between the H level (VCD_2H) and L level (VCD_2L=0V) of the CDATA terminal 203b corresponding to the second communication method, and is lower than the L level (VCD_1L) corresponding to the first communication method. Then, the output of the comparator 422 is connected to a CAM_ON terminal of the accessory microcomputer 201.

The buffer 432 is a CMOS buffer that converts the power supply voltage into the H level of the CDATA terminal 203*b* corresponding to the second communication method. The output of the buffer 432 is connected to the CDATA_A terminal of the accessory microcomputer 201 and the I/F control unit 400 through an analog switch 434.

The output CMOS_ON of the I/F control unit 400 is connected to a control terminal of the analog switch 433 through an inverter 435 and is directly connected to control terminals of the analog switches 431 and 434.

Next, as shown in FIG. 3C, a data output (ADATA_A) terminal of the accessory microcomputer 201 is connected to the I/F control unit 400. The I/F control unit 400 controls an output ADATA_AIF according to a signal state of the ADATA_A terminal, a command from the accessory microcomputer 201, and a signal state of an input signal from the camera body 100.

The output ADATA_AIF is directly connected to a control terminal of an analog switch 451, and is connected to a control terminal of an analog switch 452 through an inverter 453. The H level voltage (VCD_1H) of the ADATA terminal 203*a* corresponding to the first communication method is applied to one terminal of the analog switch 451. The other terminal of the analog switch 451 is connected to a non-inverted input terminal of an operational amplifier 460.

The L level voltage (VCD_1L) of the ADATA terminal 203*c* corresponding to the first communication method is applied to one terminal of the analog switch 452. The other terminal of the analog switch 451 is connected to a non-inverted input terminal of the operational amplifier 460.

An output terminal of the operational amplifier 460 is connected to an inverted input terminal thereof. When the output ADATA_AIF is the H level, the analog switch 451 becomes in the ON state, the analog switch 452 becomes in the OFF state, and the operational amplifier 460 outputs the H level voltage (VAD_1H) of the ADATA terminal 203*c* in the first communication method. On the other hand, when the output ADATA_AIF is the L level, the analog switch 451 becomes in the OFF state, the analog switch 452 becomes in the ON state, and the operational amplifier 460 outputs the L level voltage (VAD_1L) of the ADATA terminal 203*c* corresponding to the first communication method. The output terminal of the operational amplifier 460 is connected to one terminal of an analog switch 480.

The other terminal of the analog switch 480 is connected to the ADATA terminal 203*c* that is the communication contact point between the camera body 100 and the accessory 200.

The output ADATA_AIF is connected also to the input terminal of a CMOS output buffer 471 that outputs H level (VAD_2H) or L level (VAD_2L=0V) of the ADATA terminal 203*c* corresponding to the second communication method. An output of the CMOS output buffer 471 is connected to one terminal of an analog switch 481.

The other terminal of the analog switch 481 is connected to the ADATA terminal 203*c*. The CMOS_ON terminal of the I/F control unit 400 is directly connected to a control terminal of the analog switch 481, and is connected to a control terminal of the analog switch 480 through an inverter 482.

As a result of this, when the I/F control unit 400 sets the CMOS_ON terminal to the L level, the analog switch 480 becomes in the ON state, the analog switch 481 becomes in the OFF state, and the input and output in the first communication method can be used as the input and output through the communication contact unit 103. Moreover, when the I/F control unit 400 sets the CMOS_ON terminal to the H level, the analog switch 480 becomes in the OFF state, the analog switch 481 becomes in the ON state, and the input and output in the second communication method can be used as the input and output through the communication contact unit 103.

Figure 4A:
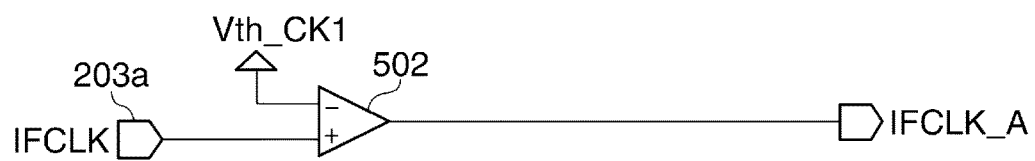
FIG. 4A, FIG. 4B, and FIG. 4C are circuit diagrams for describing the accessory communication unit that support a first communication method only in the accessory shown in FIG. 1.
Figure 4B:
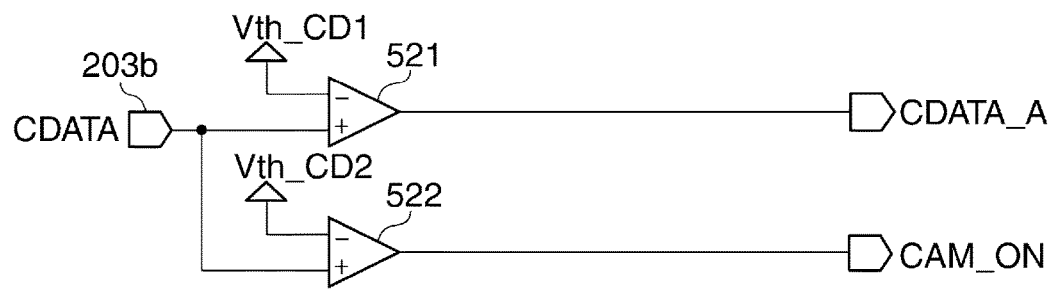
Figure 4C:
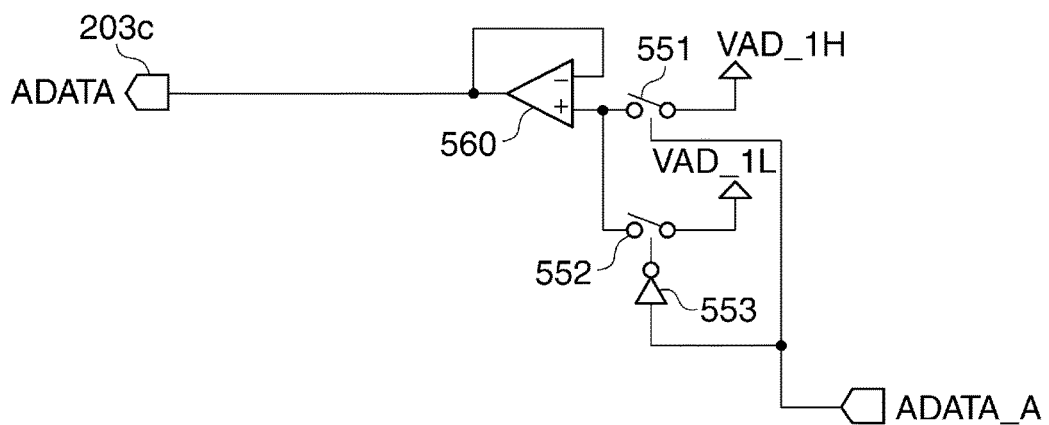

FIG. 4A, FIG. 4B, and FIG. 4C are circuit diagrams for describing the accessory communication unit 202 that support the first communication method only in the accessory 200 shown in FIG. 1, FIG. 4A is a circuit diagram showing an interface circuit concerning a clock signal transmitted to the accessory 200 from the camera body 100. FIG. 4B is a circuit diagram showing an interface circuit concerning communication data transmitted to the accessory 200 from the camera body 100. Moreover, FIG. 4C is a circuit diagram showing an interface circuit concerning data transmitted to the camera body 100 from the accessory 200.

As shown in FIG. 4A, the IFCLK terminal 203*a* that is the communication contact point between the camera body 100 and the accessory 200 is connected to a non-inverted input terminal of a comparator 502. The threshold voltage Vth_CK1 that distinguishes the H level (VCK_1H) and L level (VCK_1L) of the IFCLK terminal 203*a* corresponding to the first communication method is applied to an inverted input terminal of the comparator 502. It should be noted that a relation of VCK_1L<Vth_CK1<VCK_1H is held. Then, an output terminal of the comparator 502 is connected to the IFCLK_A terminal of the accessory microcomputer 201.

As shown in FIG. 4B, the CDATA terminal 203*b* that is the communication point between the camera body 100 and the accessory 200 is connected to non-inverted input terminals of comparators 521 and 522. The threshold voltage Vth_CD1 that distinguishes the H level (VCD_1H) and L level (VCD_1L) of the CDATA terminal 203*b* corresponding to the first communication method is applied to an inverted input terminal of the comparator 521. It should be noted that a relation of VCD_1L<Vth_CD1<VCD_1H is held. Then, an output terminal of the comparator 521 is connected to the CDATA_A terminal of the accessory microcomputer 201.

The threshold voltage Vth_CD2 is applied to an inverted input terminal of the comparator 522. The threshold voltage Vth_CD2 is in a range between the H level (VCD_2H) and L level (VCD_2L=0V) of the CDATA terminal 203*b* corresponding to the second communication method, and is lower than the L level (VCD_1L) corresponding to the first communication method. The output terminal of the comparator 522 is connected to the CAM_ON terminal of the accessory microcomputer 201.

As shown in FIG. 4C, the ADATA_A terminal of the accessory microcomputer 201 is directly connected to a control terminal of an analog switch 551, and is connected to a control terminal of an analog switch 552 through an inverter 553. The H level voltage (VCD_1H) of the ADATA terminal 203*c* corresponding to the first communication method is applied to one terminal of the analog switch 551. The other terminal of the analog switch 551 is connected to a non-inverted input terminal of an operational amplifier 560.

The L level voltage (VAD_1L) of the ADATA terminal 203*c* corresponding to the first communication method is applied to one terminal of the analog switch 552. Then, the other terminal of the analog switch 552 is connected to the non-inverted input terminal of the operational amplifier 560.

An output terminal of the operational amplifier 560 is connected to the inverted input terminal thereof and the ADATA terminal 203c. When the ADATA_A terminal of the accessory microcomputer 201 is the H level, the analog switch 551 becomes in the ON state, the analog switch 552 becomes in the OFF state, and the operational amplifier 560 outputs the H level voltage (VAD_1H) of the ADATA terminal 203c corresponding to the first communication method. On the other hand, when the ADATA_A terminal of the accessory microcomputer 201 is the L level, the analog switch 551 becomes in the OFF state, the analog switch 552 becomes in the ON state, and the operational amplifier 560 outputs the L level voltage (VAD_1L) of the ADATA terminal 203c corresponding to the first communication method.

Figure 5:
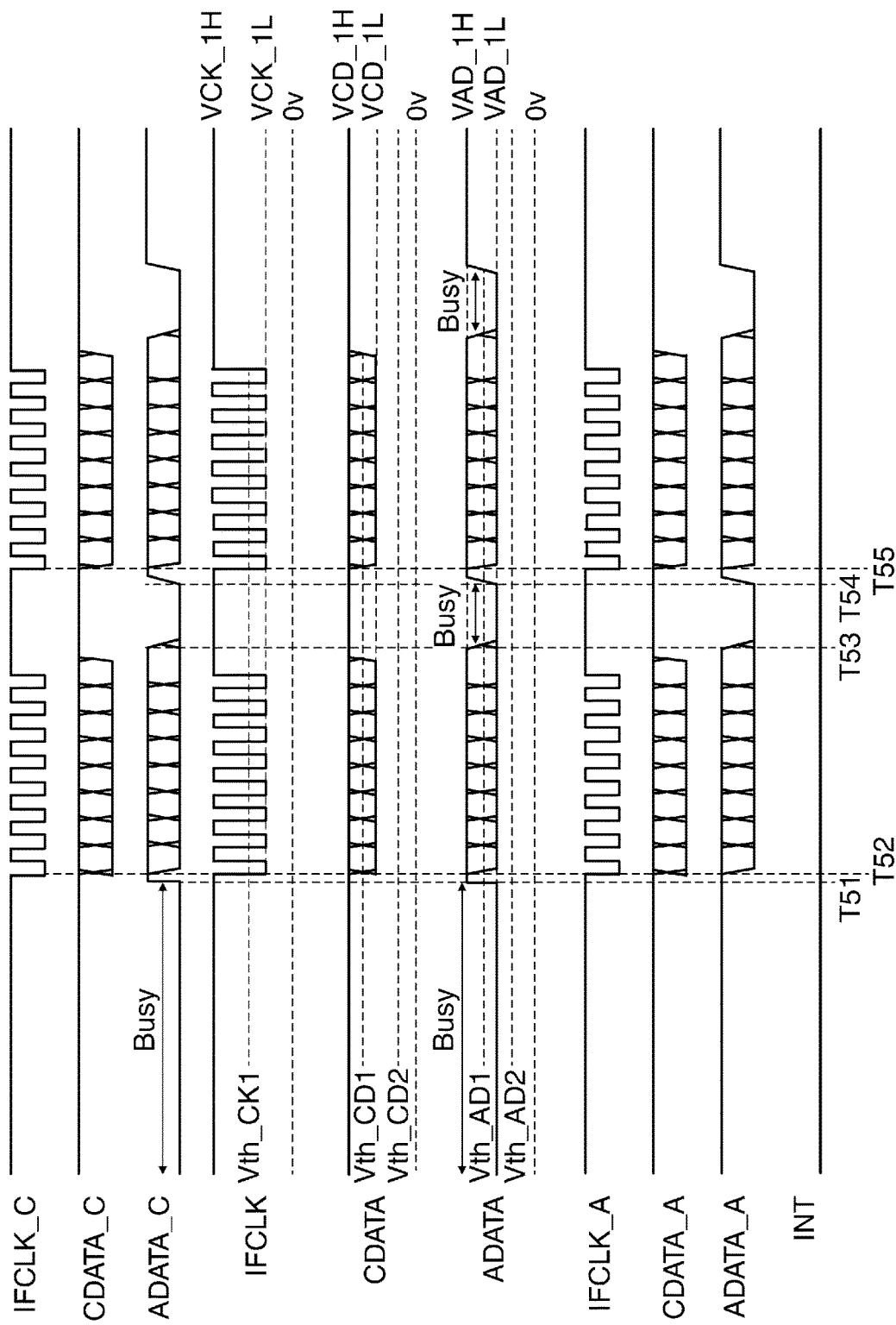
FIG. 5 is a timing chart for describing statuses of communication terminals (connection terminals) in the first communication method in the camera shown in FIG. 1.

FIG. 5 is a timing chart for describing statuses of communication terminals (connection terminals) in the first communication method in the camera shown in FIG. 1.

As shown in FIG. 5, the H level of the IFLCK terminal is VCK_1H, and the L level is VCK_1L. Moreover, the threshold set up between the H level and L level is Vth_CK1.

The H level of the CDATA terminal is VCD_1H, and the L level is VCD_1L (>0V). Moreover, the threshold set up between the H level and L level is Vth_CD1, and VCD_1L is higher than Vth_CD2 (>0V).

The H level of the ADATA terminal is VAD_1H, and L level is VAD_1L (>0 v). Moreover, the threshold set up between the H level and L level is Vth_AD1, and VAD_1L is higher than Vth_AD2 (>0 v).

In a non-communication period (IFCLK is fixed to the H level), when the signal level of the ADATA terminal is VAD_1H, the accessory 200 becomes in the communication available state. On the other hand, when the signal level of the ADATA terminal is VAD_1L, the accessory 200 becomes in a communication unavailable (Busy) state.

At a timing T51, the camera microcomputer 101 confirms that the accessory 200 has escaped from a Busy state on the basis of the signal state of the ADATA_C terminal. Then, at a timing T52, the camera microcomputer 101 starts communication and transmits the clock signal through the IFCLK terminal.

At a timing T53, the accessory microcomputer 201 outputs the Busy state by setting the ADATA signal to the VAD_1L level in order to analyze a received signal. Then, at timings T54 and T55, the camera microcomputer 101 confirms that the accessory 200 has escaped from the Busy state again, and starts the next communication.

Figure 6A:
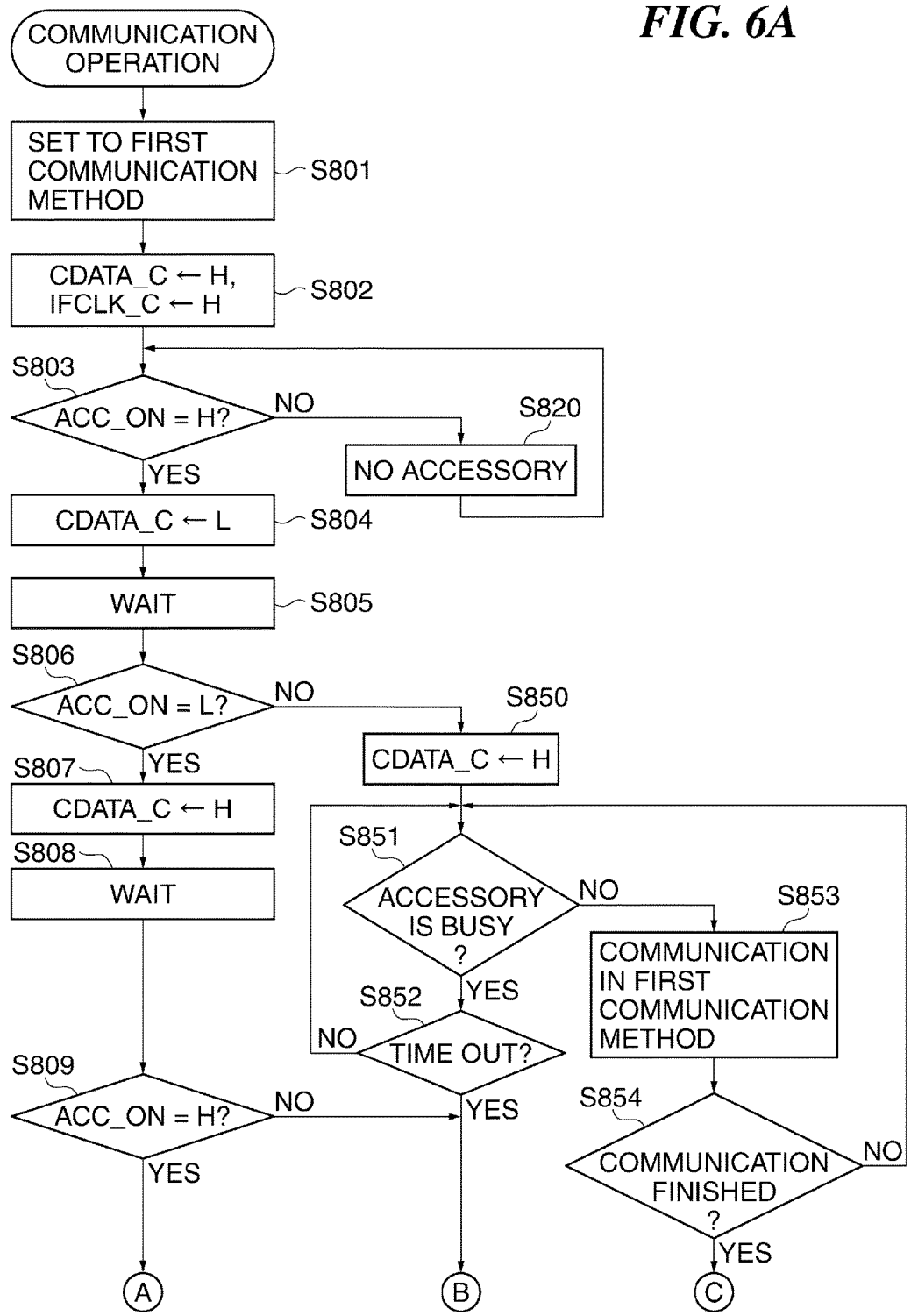
FIG. 6A and FIG. 6B are flowcharts for describing an operation (communication operation) of a camera microcomputer shown in FIG. 1.
Figure 6B:
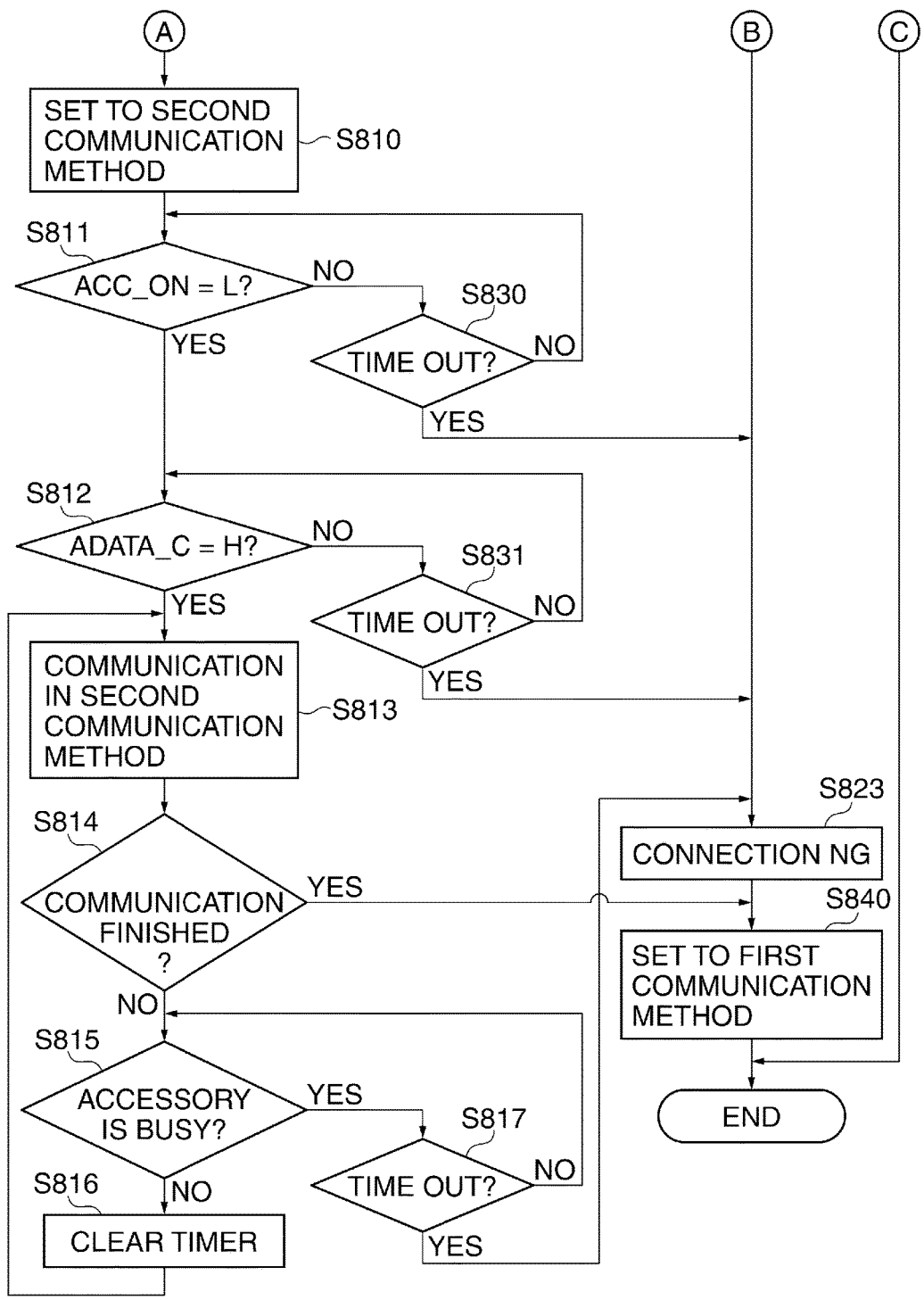

FIG. 6A and FIG. 6B are flowcharts for describing the operation (communication operation) of the camera microcomputer 101 shown in FIG. 1. Moreover, FIG. 7 is a timing chart for describing statuses of the communication terminals (connection terminals) when connections are checked and when the communication method is changed to the second communication method in the camera shown in FIG. 1. Furthermore, FIG. 8 is a timing chart for describing statuses of the communication terminals when the accessory 200 shown in FIG. 1 supports the first communication method only.

As shown in FIG. 6A, when the camera microcomputer 101 is started or a release button (not shown) is half-pressed, the camera microcomputer 101 makes the CMOS_ON terminal to the L level to set the camera communication unit (I/F) 102 to the first communication method (step S801). Then, the camera microcomputer 101 sets the CDATA_C terminal and IFCLK_C terminal to the H level (step S802).

Subsequently, the camera microcomputer 101 determines whether the ACC_ON terminal is the H level (step S803).

When the ACC_ON terminal is the L level (NO in the step S803), the camera microcomputer 101 determines that the accessory 200 is not connected to the connection terminal 103 (step S820). Then, the camera microcomputer 101 returns the process to the step S803, and monitors the connection state of the connection terminal 103 until the operation of the camera 100 stops.

When the ACC_ON terminal is the H level (YES in the step S803), the camera microcomputer 101 checks the connection of the accessory 200, and starts to check whether the accessory 200 concerned supports the second communication method. In this step, the camera microcomputer 101 sets the CDATA_C terminal to the L level first (step S804).

As a result of this, the camera microcomputer 101 sets the CDATA terminal 103b to VCD_1L while keeping the IFCLK terminal 103a at VCK_1H at a timing T61 in FIG. 7 and a timing T71 in FIG. 8.

Next, the camera microcomputer 101 waits until a predetermined period (a time period during which the accessory 200 is able to respond to the ADATA signal) elapses (step S805: WAIT). Then, the camera microcomputer 101 determines whether the ACC_ON terminal is the L level (step S806).

When the ACC_ON terminal is the H level (NO in the step S806), the camera microcomputer 101 determines that the connection of the connected accessory 200 has not confirmed and that the accessory 200 supports the first communication method only, and sets the CDATA_C terminal to the H level (step S850, a timing T72 in FIG. 8).

Subsequently, the camera microcomputer 101 determines whether the accessory 200 is in the Busy state (ADATA_C terminal=L) in step S851. When the accessory 200 is in the Busy state (YES in the step S851), the camera microcomputer 101 determines whether a timer timed out (step S852). In this step, the camera microcomputer 101 determines whether predetermined time passed after determining the Busy state of the accessory 200.

When the timer did not time out (NO in the step S852), the camera microcomputer 101 returns the process to the step S851. On the other hand, when the timer timed out (YES in the step S852), the camera microcomputer 101 determines that the accessory 200 was detached or the power of the accessory 200 was turned off (step S823). Then, the camera microcomputer 101 sets the CMOS_ON terminal to the L level to set the camera communication unit 102 to the first communication method (step S840). After that, the camera microcomputer 101 finishes the communication process with the accessory 200.

When the accessory 200 is not in the Busy state (NO in the step S851), the camera microcomputer 101 clears the timer for measuring a Busy period of the accessory 200 and communicates with the accessory 200 in the first communication method (step S853). Then, the camera microcomputer 101 determines whether the predetermined communication with the accessory 200 finished (step S854). It should be noted that the predetermined communication means a series of communications, such as communication for identify an accessory, exchange of a variety of information, and communication for emission control (in the case of a flash device).

When the predetermined communication did not finish (NO in the step S854), the camera microcomputer 101 returns the process to the step S851. On the other hand, when the predetermined communication finished (YES in the step S854), the camera microcomputer 101 finishes the communication process.

When the ACC_ON terminal is the L level (YES in the step S806), the camera microcomputer 101 sets the CDATA_C terminal to the H level (step S807), and sets the connection terminal 103*b* (CDATA terminal) to VCD_1H (a timing T62 in FIG. 7). Then, the camera microcomputer 101 waits in a predetermined period during which the accessory 200 is able to respond to the ADATA signal (step S808).

Subsequently, the camera microcomputer 101 determines whether the ACC_ON terminal is the H level (step S809). When the ACC_ON terminal is the L level (NO in the step S809), the camera microcomputer 101 proceeds with the process to step S823.

When the ACC_ON terminal is the H level (YES in the step S809), the camera microcomputer 101 assumes that the connection with the accessory 200 is confirmed and that the accessory 200 supports the second communication method, and sets the CMOS_ON terminal to the H level (step S810). Accordingly, the camera communication unit 102 is changed to the second communication method (a timing T64 in FIG. 7).

As a result, the connection terminal 103*a* (IFCLK terminal) is set to the voltage VCK_2H, and the connection terminal 103*b* (CDATA terminal) is set to the voltage VCD_2H.

Subsequently, the camera microcomputer 101 determines whether the ACC_ON terminal is the L level (step S811) in order to check whether the accessory 200 was changed to the second communication method. When the shift of the voltage of the IFCLK terminal to VCK_2H from VCK_1H is detected in the accessory 200, the ADATA terminal is set to the L level in order to inform the camera body 100 of the Busy state. Then, since the ADATA terminal becomes 0V when the accessory 200 is changed to the second communication method, the L level of the ACC_ON terminal is detected in the camera body 100.

When the ACC_ON terminal is the H level (NO in the step S811), the camera microcomputer 101 determines whether the timer timed out (step S830). In this step, the camera microcomputer 101 determines the timer times out when the ACC_ON terminal does not become the L level within a predetermined time period.

When the timer times out (YES in the step S830), the camera microcomputer 101 proceeds with the process to the step S823. On the other hand, when the timer did not time out (NO in the step S830), the camera microcomputer 101 returns the process to the step S811.

When the ACC_ON terminal is the L level (YES in the step S811), the camera microcomputer 101 determines whether the ADATA_C terminal became the H level (step S812). In this step, the camera microcomputer 101 determines whether the accessory was released from the Busy state and became in a communication available state.

When the ADATA_C terminal is the L level (NO in the step S812), the camera microcomputer 101 determines whether the timer timed out (step S831). In this step, the camera microcomputer 101 determines the timer times out when the ADATA_C terminal does not become the H level within a predetermined time period.

When the timer times out (YES in the step S831), the camera microcomputer 101 proceeds with the process to the step S823. On the other hand, when the timer did not time out (NO in the step S831), the camera microcomputer 101 returns the process to the step S812.

Wen the ADATA_C terminal is the H level (YES in the step S812), the camera microcomputer 101 assumes that the accessory 200 has been changed to the second communication method and became in the communication available state (a timing T66 in FIG. 7). Then, the camera microcomputer 101 communicates with the accessory 200 in the second communication method (step S813). When the predetermined communication finished (YES in the step S814), the camera microcomputer 101 proceeds with the process to the step S840.

On the other hand, when the predetermined communication did not finish (NO in the step S814), the camera microcomputer 101 determines whether the accessory 200 is in the Busy state (i.e., whether the ADATA_C terminal is the L level) in step S815. When the accessory 200 is in the Busy state (YES in the step S815), the camera microcomputer 101 determines whether the timer timed out (step S817). In this step, the camera microcomputer 101 determines that the timer timed out when the Busy state of the accessory 200 continues in a predetermined time period.

When the timer timed out (YES in the step S817), the camera microcomputer 101 proceeds with the process to the step S823. On the other hand, when the timer did not time out (NO in the step S817), the camera microcomputer 101 returns the process to the step S815.

When the accessory 200 is not in the Busy state (NO in the step S815), the camera microcomputer 101 clears the timer for measuring the Busy state (step S816). Then, the camera microcomputer 101 returns the process to the step S813, and continues the communication in the second communication method.

Thus, since the L level of the ADATA terminal is an intermediate voltage that is higher than 0V in the first communication method, the connection of the accessory 200 can be checked in anytime. On the other hand, the second communication method allows the communication using higher frequency as compared with the first communication method. However, since the L level of the ADATA terminal is 0V, the Busy state of the accessory and the detachment of the accessory cannot be distinguished.

The operation of the I/F control unit 400 of the accessory communication unit 202 will be described with reference to FIG. 7.

The I/F control unit 400 outputs the signal input from the ADATA_A terminal of the accessory microcomputer 201 as the ADATA_AIF signal during communication, and controls so that the accessory communication unit 202 outputs a signal that is obtained by shifting the level of the signal from the ADATA_A terminal (for example, in the period between timings T67 and T68 in FIG. 7).

When detecting that the CDATA terminal is changed to the L level from the H level in a non-communication period (IFCLK=H), the I/F control unit 400 controls so that the ADATA terminal is 0V in a period when the CDATA terminal keeps the L level. That is, the I/F control unit 400 keeps CMOS_ON=H and ADATA_AIF=L in the period between timings T61 and 162 in FIG. 7. As a result of this, the I/F control unit 400 notifies the camera body 100 that the accessory 200 supports the second communication method.

Moreover, the I/F control unit 400 detects that the signal level of the IFCLK terminal is changed to VCK_2H (a timing T64) according to CHK_CMOS and IFCLK_H that are the outputs of the comparators 401 and 402 shown in FIG. 3A. In this case, the I/F control unit 400 outputs the interrupt signal INT to the accessory microcomputer 201.

When receiving interruption by the INT signal, the accessory microcomputer 201 determines the signal level of the IFCLK terminal by communicating with the accessory communication unit 202 as mentioned later.

Furthermore, the I/F control unit 400 sets the accessory 200 to the Busy state by setting the ADATA terminal to the L level irrespective of the state of the ADATA_A terminal. After that, the accessory microcomputer 201 controls to set the I/F control unit 400 to the second communication method (a timing T65).

The I/F control unit 400 outputs the interrupt signal INT to the accessory microcomputer 201 when CHK_CMOS=H is detected in the case of the setting of the second communication method (CMOS_ON=H). Then, the I/F control unit 400 sets the ADATA terminal to the L level to set the accessory 200 to the Busy state (a timing T68). In this case, the I/F control unit 400 sets CMOS_ON=L, outputs the voltage level of the first communication method, and sets the threshold concerning the IFCLK terminal and CDATA terminal to the threshold corresponding to the first communication method.

Even if the accessory 200 is detached from the camera body 100 supporting the second communication method and is attached to the camera body 100 supporting only the first communication method in an unexpected timing, the accessory 200 does not malfunction.

When receiving interruption by the INT signal, the accessory microcomputer 201 determines the signal level of the IFCLK terminal by communicating with the accessory communication unit 202 as mentioned later. After that, the accessory microcomputer 201 controls to set the I/F control unit 400 to the second communication method.

Figure 9:
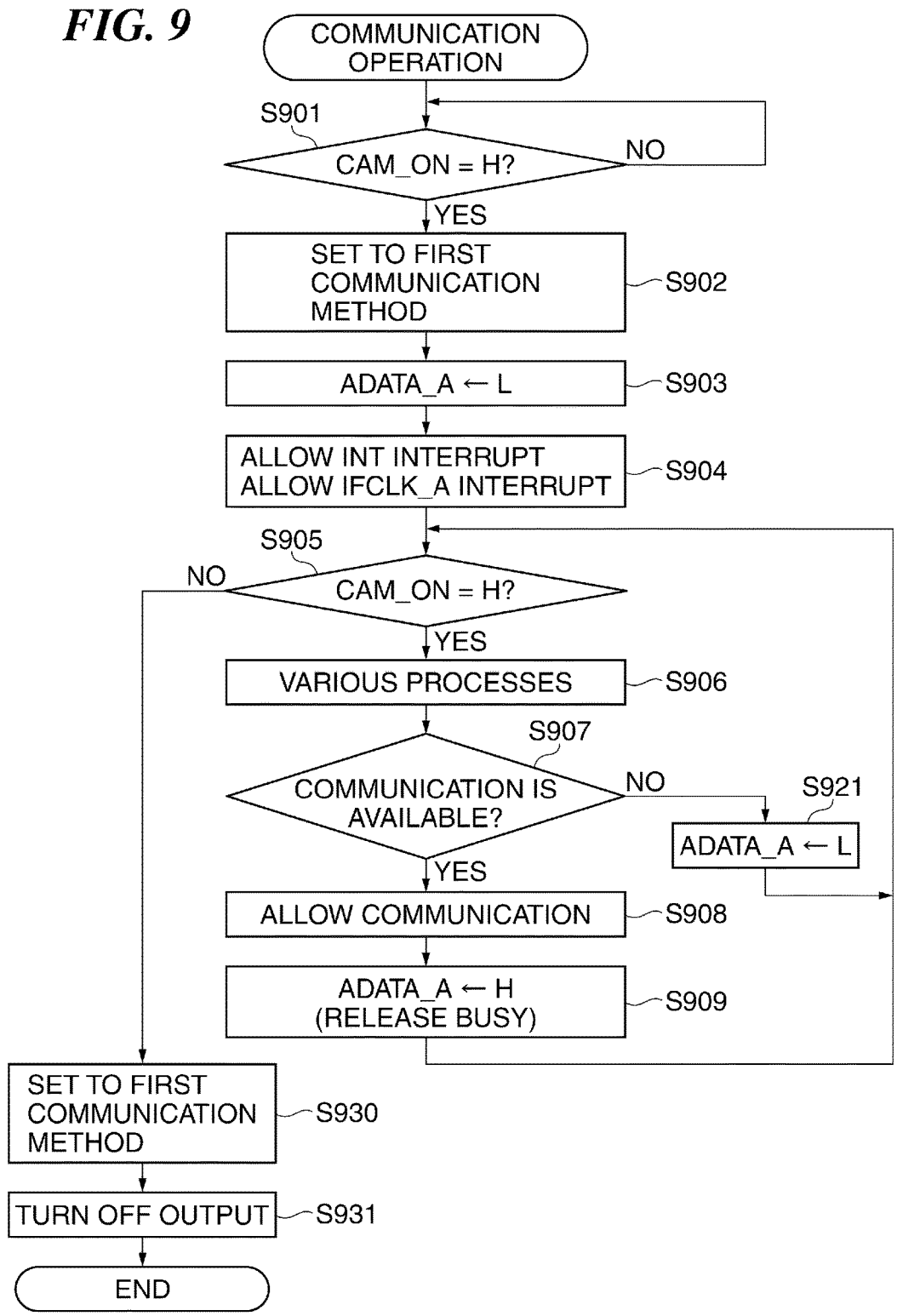
FIG. 9 is a flowchart for describing an operation (communication operation) of an accessory microcomputer shown in FIG. 1.

FIG. 9 is a flowchart for describing an operation (communication operation) of the accessory microcomputer 201 shown in FIG. 1.

When the communication operation is started, the accessory microcomputer 201 determines whether the CAM_ON terminal is the H level (step S901) in order to check the connection state with the camera body 100 and an activation status of the camera body 100. When the camera body 100 is started in the first communication method, the CDATA terminal is equal to or higher than VCD_1L (>Vth_CD2), and CAM_ON is the H level.

When the CAM_ON terminal is the L level (NO in the step S901), the accessory microcomputer 201 waits until the accessory 200 is connected to the camera body 100 and the camera becomes in the activation status.

When the CAM_ON terminal is the H level (YES in the step S901), the accessory microcomputer 201 sets the CMOS_ON terminal to the L level to set the accessory communication unit 202 to the first communication method (step S902).

Subsequently, the accessory microcomputer 201 controls the I/F control unit 400 to control the ADATA terminal to VAD_1L. In this step, the accessory microcomputer 201 controls the I/F control unit 400 by setting the ADATA_A terminal to the L level (step S903). As a result of this, the accessory microcomputer 201 notifies the camera body 100 that the accessory 200 is connected and is in the BUSY state.

Next, while the accessory microcomputer 201 performs INT terminal interruption permission, an IFCLK terminal permits IFCLK_A terminal interruption which is interruption which varies from H level to L level by starting communication (step S904). Then, the camera microcomputer 201 determines whether the CAM_ON terminal is the L level (step S806).

When the CAM_ON terminal is the H level (YES in the step S905), the accessory microcomputer 201 applies predetermined various processes to the communications data (step S906). Then, the accessory microcomputer 201 determines whether the processes applied in the step S906 enabled the communication (step S907).

When the communication becomes available (YES in the step S907), the accessory microcomputer 201 permits the communication (step S908). After that, the accessory microcomputer 201 notifies the camera body 100 that the Busy state was released by setting the ADATA_A terminal to the H level (step S909). Then, the strobe microcomputer 201 returns the process to the step S905.

When the communication is unavailable (NO in the step S907), the accessory microcomputer 201 sets the ADATA_A terminal to the L level (step S921) and notifies the camera body 100 of the Busy state. Then, the accessory microcomputer 201 returns the process to the step S905.

When the CAM_ON terminal is the L level (NO in the step S905), the accessory microcomputer 201 assumes that the interface power supply of the camera body 100 became OFF or the connection with the camera body 100 was released, and sets the accessory communication unit 202 to the first communication method (step S930). After that, the accessory microcomputer 201 turns OFF the output of the ADATA terminal (step S931), and finishes the communication process.

Figure 10:
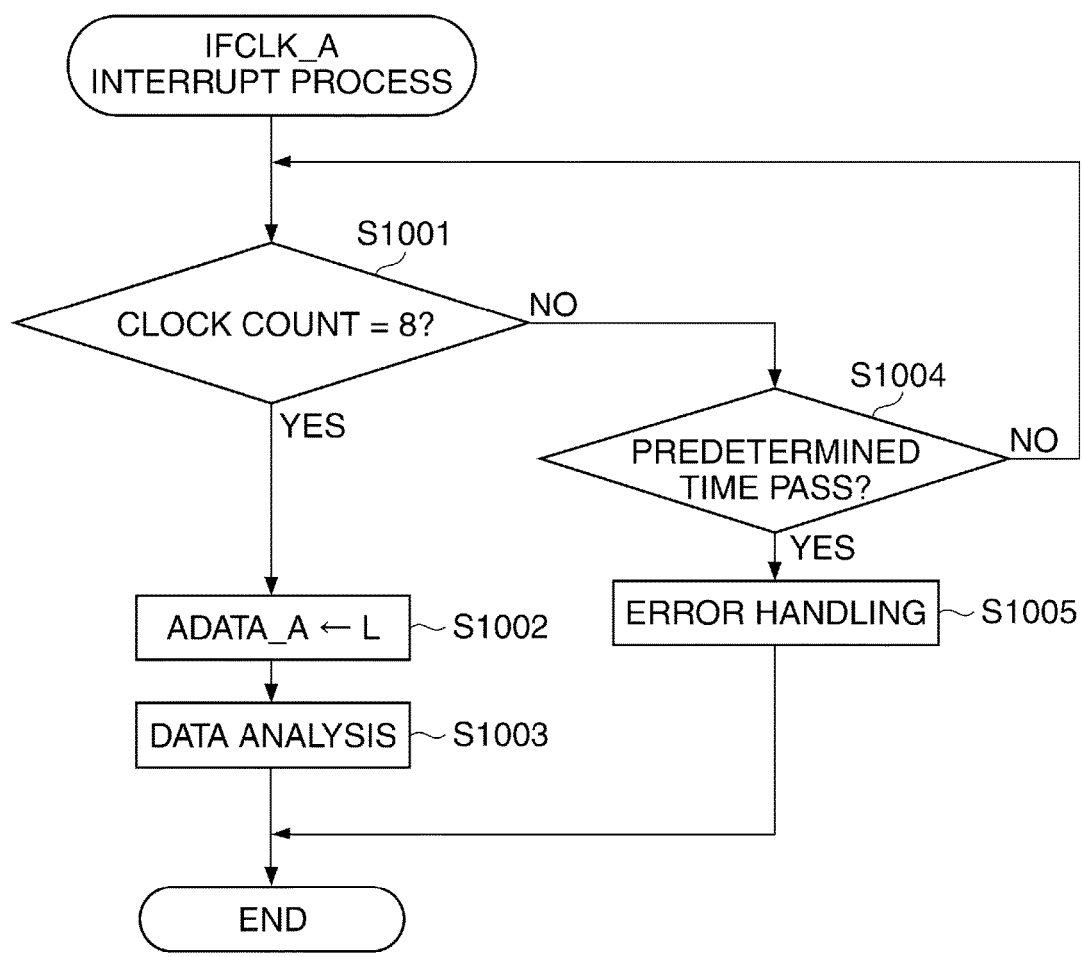
FIG. 10 is a flowchart for describing an IFCLK_A terminal interrupt process performed by the accessory microcomputer shown in FIG. 1.

FIG. 10 is a flowchart for describing an IFCLK_A terminal interrupt process performed by the accessory microcomputer 201 shown in FIG. 1.

When the camera microcomputer 101 changes the level of the IFCLK_A terminal to VC_1L from VC_1H, the accessory microcomputer 201 starts an interrupt process. First, the accessory microcomputer 201 determines whether a predetermined number (for example, 8) of clock signals were transmitted from the camera microcomputer 101 through the IFCLK terminal (step S1001).

When the predetermined number of clock signals were transmitted (YES in the step S1001), the accessory microcomputer 201 controls the accessory communication unit 202 to set the ADATA_A terminal to the L level (step S1002). As a result of this, the accessory microcomputer 201 notifies the camera body 100 of the Busy state. Then, the accessory microcomputer 201 analyzes the data received through the CDATA terminal (step S1003), and finishes the IFCLK_A interrupt process.

On the other hand, when the number of clock signals does not reach the predetermined number (NO in the step S1001), the accessory microcomputer 201 determines whether a predetermined time elapsed (step S1004). When the predetermined timer did not elapse (NO in the step S1004), the camera microcomputer 201 returns the process to the step S1001.

When the predetermined time elapsed (YES in the step S1004), the accessory microcomputer 201 performs a communication error handling (step S1005). Then, the accessory microcomputer 201 finishes the IFCLK_A interrupt process.

Figure 11:
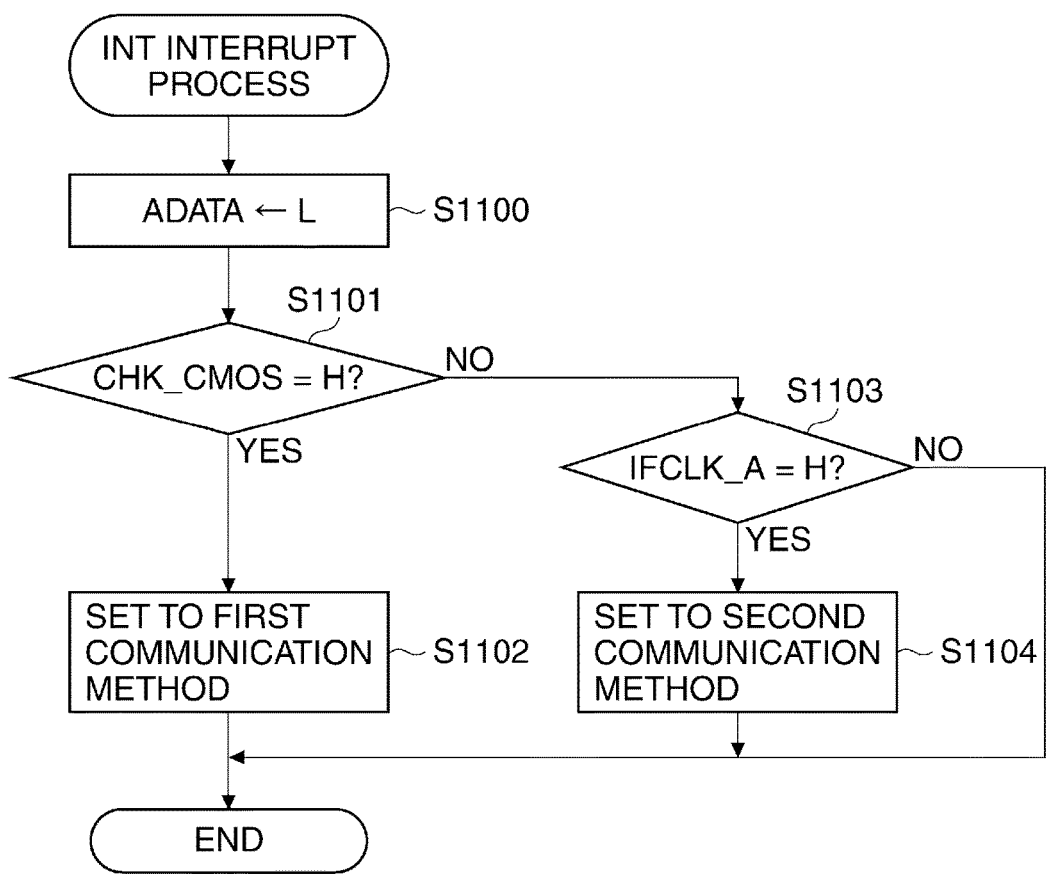
FIG. 11 is a flowchart for describing an INT terminal interrupt process performed by the accessory microcomputer shown in FIG. 1.

FIG. 11 is a flowchart for describing an INT interrupt process performed by the accessory microcomputer 201 shown in FIG. 1.

The accessory microcomputer 201 starts the INT interrupt process, when the INT terminal varies to the H level from the L level. Then, the accessory microcomputer 201 controls the accessory communication unit 202 to set the ADATA terminal to the L level (step S1100). As a result of this, the accessory microcomputer 201 notifies the camera microcomputer 101 of the Busy state.

Subsequently, the accessory microcomputer 201 communicates with the accessory communication unit 202, and determines whether the CHK_CMOS terminal is the H level (step S1101). When the CHK_CMOS terminal is the H level, the voltage level of the IFCLK terminal is higher than Vth_CK3. As a result, as shown in FIG. 7, the accessory microcomputer 201 determines that the camera body 100 supports the first communication method.

When the CHK_CMOS terminal is the H level (YES in the step S1101), the accessory microcomputer 201 sets the accessory communication unit 202 to the first communication method (step S1102). Then, the accessory microcomputer 201 finishes the INT interrupt process.

On the other hand, when the CHK_CMOS terminal is the L level (NO in the step S1101), the accessory microcomputer 201 communicates with the accessory communication unit 202, and determines whether the IFCLK_A terminal is the H level (step S1103). When the IFCLK_A terminal is the H level, the voltage level of the IFCLK terminal is higher than Vth_CK1.

When the IFCLK_A terminal is the H level (YES in the step S1103), the CHK_CMOS terminal is the L level, and accordingly, the accessory microcomputer 201 determines that the camera body supports the second communication method. Then, the accessory microcomputer 201 sets the accessory communication unit 202 to the second communication method (step S1104). After that, the accessory microcomputer 201 finishes the INT interrupt process.

On the other hand, when the IFCLK_A terminal is the L level (NO in the step S1103), the accessory microcomputer 201 finishes the INT interrupt process.

Thus, the embodiment of the present invention enables the connection check and the change to the second communication method (second communication mode) without affecting the accessory supporting the first communication method (first communication mode) only. Furthermore, the embodiment enables to change the communication method to the second communication method in short time without performing communication in the first communication method.

Furthermore, the accessory supporting the second communication method, which has high communication speed, is also set to the first communication method except communicating. As a result of this, although the communication speed in the first communication method is slow, the connection is detected in real time because the intermediate voltage is used as the L level. As a result, the high speed communication and the real-time connection detection are compatible according to the switching of the communication method.

For example, when the accessory is a flash device, the accessory becomes in the Busy state during the light emission and the communication is prohibited. When the second communication method is used, since the ADATA terminal becomes 0V in the Busy state, the camera body cannot distinguish the Busy state of the flash device and the detachment of the flash device. On the other hand, the above-mentioned embodiment is able to distinguish the Busy state and the detachment of the flash device, which enables a quick operation when the flash device is detached.

Although the above-mentioned embodiment described a camera as an example of the electronic apparatus, the present invention is applicable to another electric apparatus as long as an accessory device is connected to a body of the electronic apparatus. Moreover, although a flash device is described as an accessory device, the present invention is applicable to other accessory devices, such as a display device and a communication device, as long as the accessory device is connected to the body of the electronic apparatus.

As is clear from the above description, the camera microcomputer 101 and the camera communication unit 102 function as the detection unit and the setting unit in the example shown in FIG. 1. Moreover, the camera microcomputer 101 and the camera communication unit 102 function as a first transmission unit, second transmission unit, and first reception unit. Furthermore, the camera microcomputer 101 and the camera communication unit 102 function as a level comparison unit and determination unit.

The accessory microcomputer 201 and the accessory communication unit 202 function as a notification unit or a changing unit. Furthermore, the accessory microcomputer 201 and the accessory communication unit 202 function as a second reception unit, third reception unit, and third transmission unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-163749, filed Aug. 21, 2015, which is hereby incorporated by reference herein in its entirety.

What is claimed is:

1. An electronic apparatus capable of communicating with an accessory device connected, the electronic apparatus comprising:
   a detection unit configured to detect whether the accessory device supports both a first communication method and a second communication method of which communication speed is higher than communication speed of the first communication method; and
   a setting unit configured to set the second communication method during communication between the electronic apparatus and the accessory device and to set the first communication method during no communication between the electronic apparatus and the accessory device, when said detection unit detects that the accessory device supports both the first communication method and the second communication method.

2. The electronic apparatus according to claim 1, wherein said setting unit sets the first communication method during communication with the accessory device when said detection unit detects that the accessory device supports the first communication method only.

3. The electronic apparatus according to claim 1, further comprising:
 a first transmission unit configured to transmit a clock signal to the accessory device;
 a second transmission unit configured to transmit electric device data to the accessory device in synchronization with the clock signal; and
 a first reception unit configured to receive accessory data from the accessory device in synchronization with the clock signal.

4. The electronic apparatus according to claim 3, further comprising:
 a level comparison unit configured to compare a voltage level of the accessory data with a predetermined threshold voltage; and
 a determination unit configured to determine whether the accessory device is connected according to a comparison result by said level comparison unit.

5. The electronic apparatus according to claim 4, wherein a low level of the accessory data is higher than the threshold voltage in the first communication method, and a low level of the accessory data in the second communication method is lower than the threshold voltage.

6. The electronic apparatus according to claim 5, wherein a high level used in the first communication method is a differ voltage level from a high level used in the second communication method, and
 wherein said setting unit notifies the accessory device that the first communication method was set by setting the signal used in the first communication method to the high level.

7. The electronic apparatus according to claim 6, wherein said setting unit determines that the first communication method was set when the accessory data becomes the low level in the first communication method and then becomes the high level in the first communication method after notifying that the first communication method was set.

8. The electronic apparatus according to claim 1, wherein said electronic apparatus comprises an image pickup apparatus that picks up an image of an object and obtains image data, and the accessory device comprises a light emission device.

9. An accessory device capable of communicating with an electronic apparatus connected, the accessory device comprising:
 a setting unit configured to set one of a first communication method and a second communication method of which communication speed is higher than communication speed of the first communication method;
 a reception unit configured to receive a clock signal transmitted from the electronic apparatus; and
 a notification unit configured to notify the electronic apparatus that the first communication method is set by changing accessory data to a high level from a low level in the first communication method, when change of the clock signal to the high level in the first communication method is detected.

10. The accessory device according to claim 9, further comprising a changing unit configured to change to the first communication method and to notify the electronic apparatus of the change when the change of the clock signal to the high level in the first communication method is detected.

11. The accessory device according to claim 9,
 wherein the accessory device comprises a light emission device,
 wherein said setting unit sets the first communication method during emission control, and
 wherein said notification unit notifies the electronic apparatus of a busy state by setting the accessory data to the low level during light emission operation.

12. A control method for an electronic apparatus capable of communicating with an accessory device connected, the control method comprising:
 a detection step of detecting whether the accessory device supports both a first communication method and a second communication method of which communication speed is higher than communication speed of the first communication method; and
 a setting step of setting the second communication method during communication between the electronic apparatus and the accessory device and to set the first communication method during no communication between the electronic apparatus and the accessory device, when it is detected that the accessory device supports both the first communication method and the second communication method in said detection step.

13. A control method for an accessory device capable of communicating with an electronic apparatus connected, the control method comprising:
 a setting step of setting one of a first communication method and a second communication method of which communication speed is higher than communication speed of the first communication method;
 a receiving step of receiving a clock signal transmitted from the electronic apparatus; and
 a notification step of notifying the electronic apparatus that the first communication method is set by changing accessory data to a high level from a low level in the first communication method, when change of the clock signal to the high level in the first communication method is detected.

14. A non-transitory computer-readable storage medium storing a control program causing a computer to execute a control method for an electronic apparatus capable of communicating with an accessory device connected, the control method comprising:
 a detection step of detecting whether the accessory device connected supports both a predetermined first communication method and a second communication method of which communication speed is higher than communication speed of the first communication method; and
 a setting step of setting the second communication method during communication between the electronic apparatus and the accessory device and to set the first communication method during no communication between the electronic apparatus and the accessory device, when it is detected that the accessory device supports both the first communication method and the second communication method in said detection step.

15. A non-transitory computer-readable storage medium storing a control program causing a computer to execute a control method for an accessory device capable of communicating with an electronic apparatus connected, the control method comprising:
 a setting step of setting one of a first communication method and a second communication method of which communication speed is higher than communication speed of the first communication method;

a receiving step of receiving a clock signal transmitted from the electronic apparatus connected; and a notification step of notifying the electronic apparatus that the first communication method is set by changing accessory data to a high level from a low level in the first communication method, when change of the clock signal to the high level in the first communication method is detected.

* * * * *